UNITED STATES PATENT OFFICE.

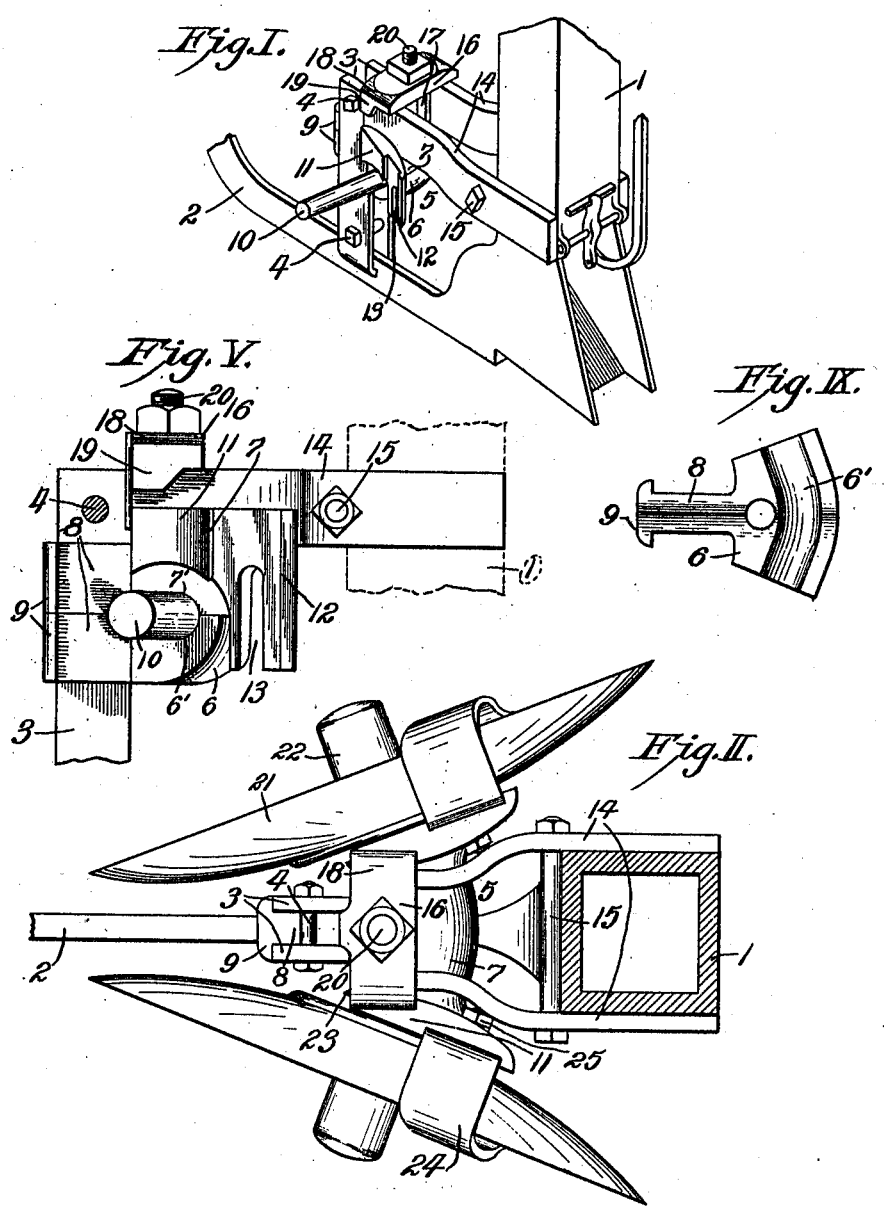

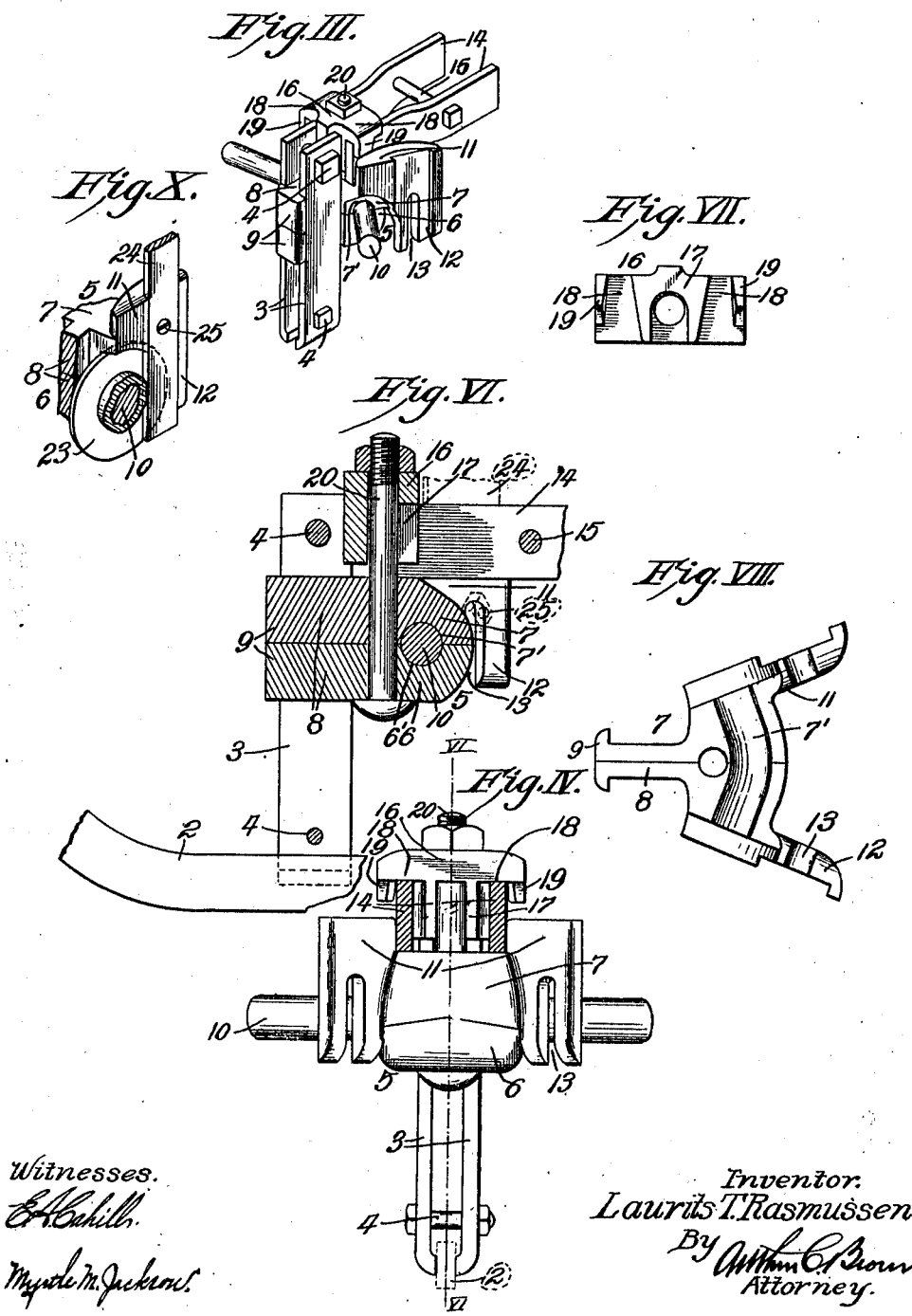

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

FURROW-OPENER.

988,386.      Specification of Letters Patent.      Patented Apr. 4, 1911.

Application filed April 7, 1909. Serial No. 488,410.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Furrow-Openers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to furrow openers and has for its object to provide a device of that class which may be attached to planters of any ordinary construction and may be adjusted to regulate the depth of the furrow opening. In accomplishing this object, I have provided the improved details of structure presently described and pointed out in the claims, reference being had to the accompanying drawings, in which like reference numerals refer to like parts throughout the several views and in which:—

Figure I is a perspective view of the body portion of my improved furrow opener, showing the manner of its application to the planter seed tube and shoe, the opener disks being removed for better illustration. Fig. II is a plan view of the complete device, also shown applied to the planter seed tube and shoe. Fig. III is a front perspective view of the body portion of the opener. Fig. IV is an enlarged rear view of same. Fig. V is a side view of same, with a portion of the standard removed. Fig. VI is a longitudinal sectional view on the line VI—VI, Fig. IV. Fig. VII is an end view of the clamp block for holding the head against the seed tube arms. Figs. VIII is an inverted plan view of the upper portion of the head block. Fig. IX is a plan view of the lower portion of said head block. Fig. X is a perspective view of a portion of the head block and cleaner blade, showing the manner of anchoring the disks.

Referring more in detail to the parts:— 1 designates a seed tube and 2 the shoe of a planter of ordinary construction.

3 designates a standard, preferably comprising a pair of legs, the lower end of each of which is adapted to extend over the planter shoe, and is provided, near its ends, with apertures for receiving the bolts 4.

5 designates a head block which is preferably divided to form a lower member 6 and an upper member 7. Each of members 6—7 is provided with a forwardly extending neck 8 that is adapted to project between the legs of standard 3 and has a cross head 9 that is adapted for engagement with the forward edges of said legs, for the purpose of anchoring the head block against rearward displacement, when the opener is in use. Each of the block portions is provided with a groove 6'—7' for receiving a disk axle 10 which is bent forwardly from its center, in order to provide a desired angle for the disks. The grooves 6'—7' are inclined forwardly from the longitudinal center of the head in order to conform to the angle of the axle 10 and retain same in its proper relation thereto. Each side of the upper portion 7, of the head block, is provided with a laterally projecting flange 11 which is rounded over the axle groove in order to provide a socket for the disk hub and is provided, at the rear, with a downwardly extending wing 12, having a vertical slot 13.

14 designates arms which extend horizontally at the sides of the seed tube 1 and are provided with apertures through which the bolt 15 is extended, for the purpose of anchoring the rear ends of the arms against said tube, the forward ends of said arms being preferably turned inwardly at their forward ends in order that they may extend between the flanges 11 on the upper portion of the head block.

16 designates a clamp block, having a body portion 17 that is adapted to fit between the horizontal arms 14. Extending laterally from the top of the clamp block are wings 18 which are adapted to overlay the arms 14 and are provided with flanges 19 which depend over the outer sides of said arms and are adapted for retaining said arms in position on the head block. The head block portions and the clamp block are provided with apertures which are adapted for registration, when the parts are assembled.

20 designates a bolt that extends through said aperture and serves to bind the parts together and fix same to the horizontal arms 14.

21 designates disks, having hubs 22 revolubly mounted on the axle 10, each of said hubs being provided with an inner flange 23 for forming a groove between same and the body of the disk.

24 designates cleaner blade, each of which is adapted to fit against a wing 12 on the head block member and has a bolt 25 that is adapted for projection through the wing slot 13 and is adapted for rigidly fixing said blade to the head block. The slot 13 is so arranged, relative to the disk hub socket, that the forward edge of the cleaner blade will, when the parts are assembled, project into the groove between the flange 23 and the body of the disk and anchor the disk against lateral displacement, without interfering with the free revolution of the disk.

In assembling the parts, the neck portions of the head block are projected between the standard legs and the latter fitted over the planter shoe at a proper distance from the seed tube to enable the horizontal arms 14 to project over the body of the block between the side flanges 11. The bolts 14 are then tightened to anchor the standard and planter shoe and bind the head block neck between the leg members, and the bolt 15 tightened to clamp the horizontal arms firmly against the seed tube. The bolt 20 is then tightened to firmly unite the individual head block parts and bind the clamp block firmly against the arms 14. With the parts in this condition and the disks 21 revolubly mounted on the axle ends, the apparatus is ready for use. It is readily apparent that the disks may be adjusted vertically by varying the position of the horizontal arms and that the cross heads 9 will prevent backward displacement of the head block under pressure from the disks.

Having thus described my invention, what I claim as new therein and desire to secure by Letters Patent is:—

1. In a furrow opener, a single head block comprising mating sections, having facing grooves for forming an axle socket, an axle located in said socket and projecting laterally from opposite sides of the head block, means for binding said sections together, and means for attaching said head block to a planter.

2. The combination with a planter seed tube and shoe, of arms carried by the seed tube, a standard carried by said shoe, a head block connected with said standard, a clamp member adapted for vertical movement relative to said head block and having flanges adapted for projection over said arms, means for tightening said clamp member toward the head block, and disks revolubly mounted on said head block.

3. The combination with a planter seed tube and shoe, of standard legs clamped to said shoe and projecting upwardly therefrom, a head block comprising upper and lower sections each provided with a groove and aperture that are adapted for registration when the block is assembled, and each section being provided with a neck that is adapted for projection between the standard legs and has a head that is adapted for engagement with the front edges of said legs, arms carried by the seed tube and projecting over said head block, a clamp member, having flanges adapted for engaging said arms, a bolt extending through the head block sections and clamp member, and disks revolubly mounted on said head block.

4. In a furrow opener, a head block having an inset socket at each side, and a slotted wing located adjacent to each of said sockets, axles projecting laterally from the socketed portions of said head block, disks revolubly mounted on said axles, flanges projecting from each disk into one of the head block sockets, cleaner blades having bolt and slot connection with said wings and each having a portion projected between a disk body and its flange, and means for attaching said head block to a planter.

5. The combination with a planter seed tube and shoe, of a head block, having flanges at each upper side edge, and a forwardly projecting neck, arms carried by the seed tube and projecting between said flanges, standard legs carried by the shoe and embracing said neck, a clamp member, connected with the head block, and having a top plate adapted to overlay said arms and provided with depending end flanges, and disks revolubly mounted on said head block.

6. The combination with a planter seed tube and shoe, of arms carried by the seed tube, a standard carried by said shoe, a head block connected with said standard, a clamp member on the upper face of said arms, a bolt connecting said head block and said clamp member for drawing said block toward said arms, and disks revolubly mounted on said head block.

7. The combination of a planter seed tube and shoe, of arms carried by the seed tube, a standard connecting said arms and the shoe, a head block connected with the standard, a clamp member projecting over said arms and adapted for vertical movement relative to the head block, means for drawing the clamp member and the head block together, and disks revolubly mounted on the head block.

In testimony whereof I affix my signature in presence of two witnesses.

LAURITS T. RASMUSSEN.

Witnesses:
G. F. SPOONER,
W. I. WALKER.

Copies of this patent may be obtained for five cents each, by addressing the "Commissioner of Patents, Washington, D. C."